United States Patent [19]
Miller

[11] 3,771,354
[45] Nov. 13, 1973

[54] RAPID ULTRASONIC INSPECTION APPARATUS

[75] Inventor: Darrow L. Miller, Los Angeles, Calif.

[73] Assignee: North American Rockwell Corporation, El Segundo, Calif.

[22] Filed: Dec. 6, 1971

[21] Appl. No.: 204,838

Related U.S. Application Data

[63] Continuation-in-part of Ser. No. 7,274, Jan. 30, 1970, abandoned.

[52] U.S. Cl. ............ 73/67.7, 73/67.8 S, 73/71.5 U
[51] Int. Cl. .......................................... G01n 29/04
[58] Field of Search.................. 73/67.5, 67.6, 67.7, 73/67.8, 67.9, 71.5

[56] References Cited
UNITED STATES PATENTS

| | | | |
|---|---|---|---|
| 3,541,840 | 11/1970 | Phelan | 73/71.5 |
| 3,384,767 | 5/1968 | Arnold et al. | 73/67.5 R |
| 3,423,993 | 1/1969 | Lynnworth | 73/71.5 |
| 3,678,737 | 7/1972 | Miller | 73/71.5 |

Primary Examiner—Richard C. Queisser
Assistant Examiner—Arthur E. Korkosz
Attorney—L. Lee Humphries et al.

[57] ABSTRACT

A probe for a non-destructive testing to identify internal structural defects during continuous rolling contact with a workpiece surface. A rotatable element on the probe has a plurality of separate piezoelectric segments secured thereto and elastically supported to contact the workpiece individually and progressively. A dry acoustical couplant secured to each segment forms a mechanical bond and acoustical impedance match between the piezoelectric segments and the workpiece surface.

20 Claims, 10 Drawing Figures

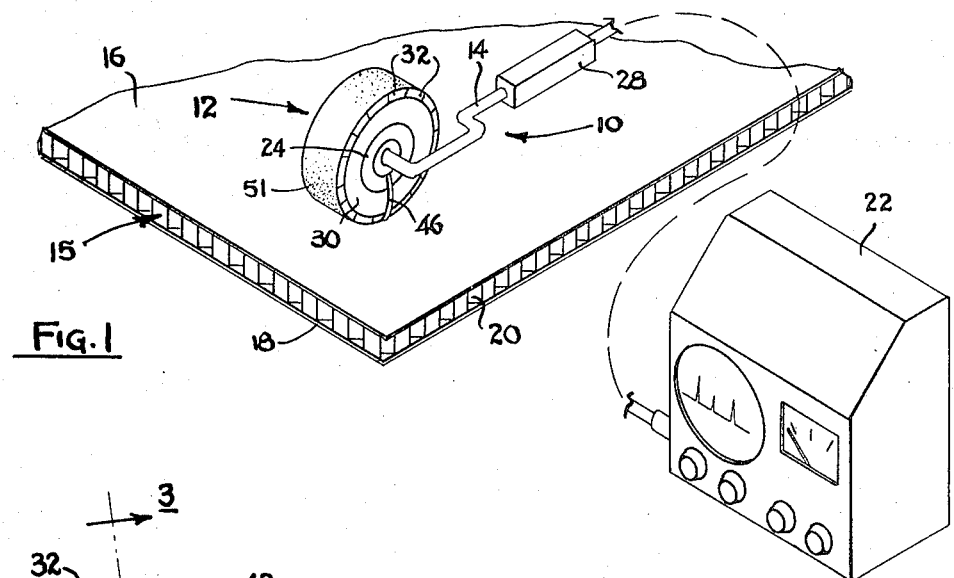
FIG.1
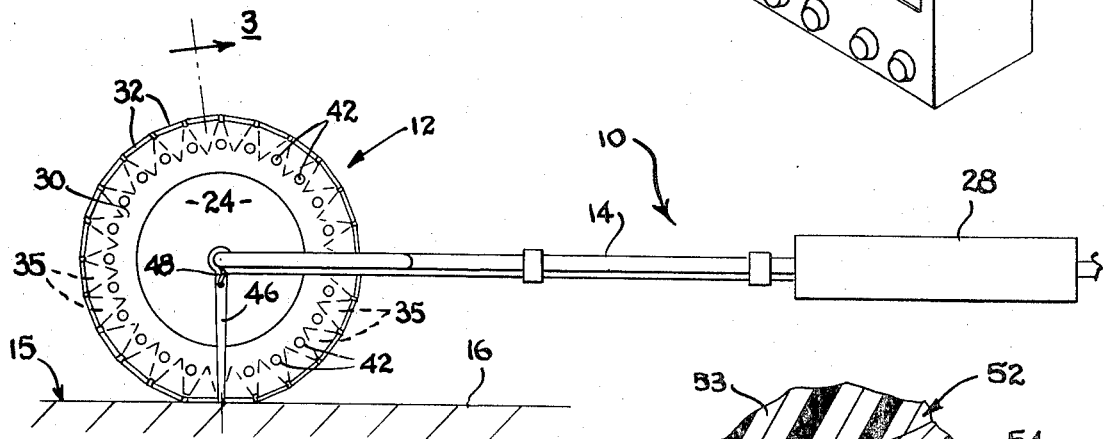
FIG.2
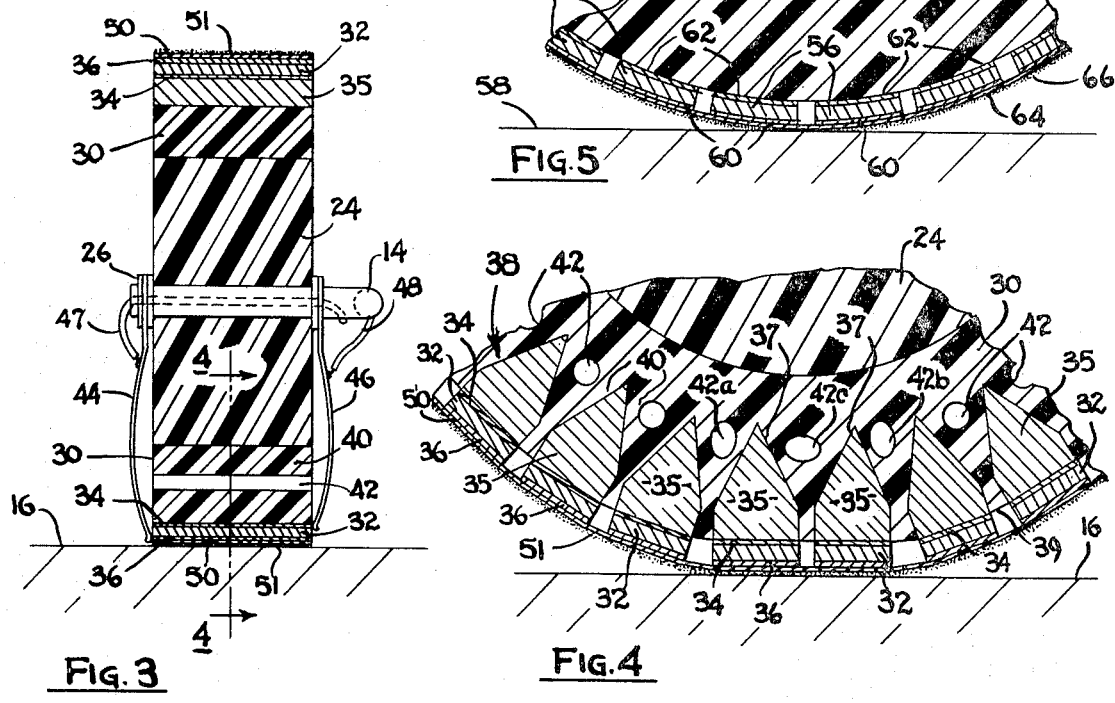
FIG.3
FIG.5
FIG.4

RAPID ULTRASONIC INSPECTION APPARATUS

CROSS-REFERENCE TO RELATED APPLICATION

This application is a continuation-in-part of the following application by applicant Darrow L. Miller, Ser. No. 7,274, filed Jan. 30, 1970, for Rapid Ultrasonic Inspection Apparatus, now abandoned.

BACKGROUND OF THE INVENTION

The non-destructive testing of manufactued articles to locate structural defects therein is widely practiced in modern industry. Such testing is of particular importance in high speed aircraft and space vehicles. To maintain the strength of the completed structure it is necessary to locate and repair defective or unbonded areas. Inspection of structural components in the field, such as composite panels in an aerial vehicle, connot be conveniently inspected by conventional ultrasonic methods after complete and permanent installation of the panels in such vehicle. Also, since cracks, defects and disbonds may occur periodically during the service life of an aircraft, it is necessary to inspect the aircraft structure not only during its initial fabrication but many times thereafter between flights. It should be noted that supersonic aircraft contain large areas of bonded structure, whereby periodic inspection involves a considerable and almost continuous effort.

Heretofore, it has been found most desirable to employ an ultrasonic probe to discover disbonds in composite structures in a non-destructive manner. Ultrasonic probes when employed with conventional electronic equipment produce a pulse of ultrasonic energy which is transmitted within the structure of the workpiece. The energizing signal is reflected and/or attenuated upon coming into contact with any discontinuity within the workpiece, and this refelction or change in received signal amplitude is picked up by the probe and displayed by some conventional means such as an oscilloscope. The acoustical pulse is usually produced by the application of the piezoelectric effect. The piezoelectric effect is where certain materials of a crystalline structure (typically barium titanate, lead zirconate, lead metaniobate) are caused to physically vibrate upon applicaion of a voltage gradient thereto producing a pulse of ultrasonic energy. The crystal structure of the probe physically deforms and produces pulses. The resultant electric pulse is transmitted to the workpiece and any discontinuities within the workpiece are detected by the reflection and/or attenuation of the return signal.

The most common type of acoustical probe used for ultrasonic inspection has been typically of flat disc form. To effect the efficient transmission of the electric pulse into the workpiece and accurate sensing of the reaction, the flat disc probe typically requires the use of a liquid or a paste couplant which wets the workpiece surface and the probe together acoustically. The probe is then moved translationally across the workpiece surface in sliding relationship therewith across the intervening film of couplant. Any disbonds located within the workpiece are then detected by analysis or comparison of each energizing pulse with its corresponding reflected pulse.

There are several disadvantages associated with use of flat disc probes. Workpiece surfaces which are extremely rough or otherwise exhibit high friction in respect to the probe are difficult or impossible to inspect by such a probe except by complete immersion of both the probe and the workpiece within the couplant. Such an immersion would be completely impossible when attempting to discover disbond areas within structural surfaces of an aircraft. Additional disadvantages of the wet coupling method are that the couplants are messy, costly, involve risk of corrosion, contamination and usually leave residual traces.

To overcome the disadvantages of the wet coupling method, a roller type of probe has been employed as disclosed in my copending application Ser. No. 832,568 filed June 12, 1969. Roller type probes as suggested in my stated patent application are designed in the shape of a continuous surface cylinder of piezoelectric material. As the roller incurs only a line contact with the workpiece surface, such rollers facilitate the inspection of rough or high friction materials. To avoid the use of a wet couplant in the employment of the roller probe, a dry couplant has been employed as disclosed and claimed in my said patent application, comprising glass beads secured by adhesive to glass cloth. The mentioned dry couplant forms a good mechanical bond with the workpiece, permitting efficient energy transmission and reflection in the same manner as the wet couplant.

For testing bonded honeycomb metal glass composites, cork and rubber surfaced laminates, frequencies between 10 to 50 Kilohertz are employed. A roller type of probe employing the effect of "hoop resonance" is used to detect a change in loading or stored energy. A crystal located within the roller probe is formed in the shape of a tubular element of a cylinder of a certain longitudinal length and a certain diameter. The piezoelectric material and mounting are selected to provide the highest possible mechanical "Q." Upon application of a continuous electrical signal to the crystal, the crystal will deform in both its length and its thickness as well as deforming in diameter. It has been found that roller probes function most efficiently when the length, thickness and diameter of the crystals are so related as to produce a resonant condition of the crystal vibration diametrically at the lower possible frequency. This diametrical vibration is referred to as the "hoop resonance" of a crystal wherein the ends of the crystal have little or no diametrical change of dimension with the maximum diametrical change occurring midway between the two ends of the crystal. It has been found that different preselected lengths of the crystal for any given diameter of the crystal has been found to produce a difference in the "hoop resonance" frequency of the crystal. Therefore, the preferred length of any particular crystal is that which produces "hoop resonance" in the diametrical mode at the lowest possible frequency.

"Hoop resonance" in piezoelectric configurations 1 to 3 inches in diameter occurs between 15 and 40 Kilohertz. Although such frequencies of resonance are satisfactory for most workpiece materials, high frequencies, between 1 and 15 Megahertz, are necessary for locating defects in thick metallic structures, metal laminates and wherever extreme resolution is a prerequisite. Also, with the use of low frequency probes of a pulse-echo type rather than the continuous wave resonance loading probe, it is difficult to discover defects near the workpiece surface as the reflection of the pulse denoting the defect is interfered with by the generating pulse. Although it has heretofore been difficult to design a practical roller type probe to operate at frequencies of 1 to 15 Megahertz, such a high frequency device would have high resolving power, would be able to discern defects right adjacent to the surface and also to discern defects deep within diffusion bonded and all metal structures.

In the designing of the previous type of roller probe, it has been the primary aim to use a material and mounting configuration providing a high mechanical "Q" and to accentuate the "hoop resonance." In other words the diametrical change of the crystal is maximized and the other dimensional changes are made negligible in comparison. However, it is known that the half or full wave thickness resonance of the crystal is a much higher frequency than diametrical resonance. Therefore, if a pulse echo or pulse receiver ultrasonic roller type probe could be designed which operated upon the half or full wave thickness resonance of the crystal and not the diametrical change of the crystal, it would operate satisfactorily at the high frequencies between 1 and 15 Megahertz. Such a roller in contract to the low frequency device would be constructed of low "Q" material and would be highly mechanically damped to provide a wide bandwidth and prevent ringing.

SUMMARY OF THE INVENTION

The roller probe of this invention delineates a novel flexible segmented roller device which when combined into the described design concepts will improve high speed ultrasonic inspection apparatus. When surfaced with a suitable dry coupling media, it may be employed with commercially available ultrasonic inspection equipment for the high speed inspection of both flat and curved structures relative to joint defects, cracks, far side surface corrosion and material delaminations. Such dry coupling media, usable on all the embodiments disclosed herein, includes flexible cured solventless elastomers. The first embodiment of the probe of this invention provides for the deploying of a plurality of planar segments located in a spaced apart relationship about a wheel-like center structure. The wheel-like center structure includes an electrical commutator or other switching device to provide an electrical charge to the element or elements in contact with the workpiece. The individual piezoelectric mounting structure is resilient to permit a flexible movement of each segment upon coming into contact with the workpiece. The center structure is chosen to be of a material given a satisfactory impedance relationship with the material of the segmented crystals as well as satisfactory damping of each pulse, thereby providing the necessary bandwidth and facilitating the pick-up of the reflected pulse from the workpiece. The roller probe formed by the first embodiment of this invention is capable of employing a single "flat" segment as both the transmitter of the initial pulse and the receiver of the reflected pulse. Each segment produces an area contact relationship with the test structure. The first embodiment (flat segment) design concept offers extreme flexibility for beam divergence control in different materials. A low frequency transducer (1MHz) (large contact area, large diameter) can be designed for extremely glossy and thick structures. Conversely, a high frequency (15 to 20 MHz) may be constructed with a small area of contact and small diameter for detecting minute defects. Also, the roller probe of the first embodiment can be constructed so that the segmented crystals can be alternated around the circumference of the roller wherein one crystal operates as a transmitter and the adjacent crystal operates as a receiver and so forth. The roller probe of the second embodiment of this invention provides for the forming of the crystal surface in a plurality of "arcuate" shaped segments. This configuration results in a "line" couple and somewhat fan shaped acoustical beam which is desirable for some inspection applications viz orbiting weld inspection of tubing. The center portion of the roller is to support the segments in a substantially fixed spaced apart relationship. upon moving the roller upon the workpiece surface, each individual segment is sequentially activated to produce the required ultrasonic pulse. Each arcuate segment produces a line contact relationship with the workpiece facilitating emission of the pulse. The flat and curved segments of the first and second embodiments respectively are to be formed of piezoelectric material, and capable of producing an ultrasonic energy pulse upon being subjected to a voltage gradient. The crystal structure is to be formed of a material which is susceptible to the piezoelectric effect as polycrystalline cermanic compounds such as lead metaniobate, lead titanate or lead zirconate.

The segments of the first and second embodiments of this invention are capable of being arranged in any one of several modifications. Commonly employed modifications would be the arranging of the segments within the first embodiment to form a rolling planar segment angle beam transducer. This transducer will generate an area coupled angle beam. In the second embodiment, the piezoelectric segments of the roller assembly would resemble a segmented truncated cone to generate a line couple angle beam. These arrangements are of particular advantage to imparting a pulse at a direction other than perpendicular to the surface of the workpiece, i.e., a shear wave transducer can be constructed by selecting a predetermined angular placement of the elastic coupling wedge.

The surface of the segments in the second modification may also be in the form of a trapezoid thereby insuring a constant contact of a segment with the workpiece surface. This is not necessary in the first embodiment because the elastic molding of the planar segments insure a continuous area of contact.

In other modifications of the invention, the segments of this first and second embodiment may be arranged to form a rotating Delta tool for inspecting welded joints. The tool would contain two angle beam transmitting wheels and a longitudinal wave receiving wheel with a shaped elastic dry coupling on the same axle. The wheels would be rectilinearly adjustable on the common axle to adjust the skip distance between the transmitting and receiving elements. The shear wave angle beam transmitting transducers can use planar segments. The longitudinal wave receiving elements can be arcoid to provide line width resolution or planar to provide maximum sensitivity to scatter return signals. The arcoid segmented receiving tool will provide extremely high surface plane resolution. In another modification, the segments could be arranged to be of particular advantage in the inspection of far-side corrosion of a plate structure by employing two axially adjustable wheels, one transmitting angle beams and the other serving as a longitudinal wave receiving wheel. Also, a plurality of each embodiment could be ganged to increase the speed of inspection, or the probes of different embodiments could be ganged. When a ganged combination is employed with conventional electronic multiplexing equipment, large flat or curved sections may be rapidly inspected. There is no need for leveling or multiple adjustment which are prerequisite when conventional water immersion or squirter techniques are employed.

One of the objectives of the segmented probe of this invention not readily apparent from the foregoing is that caused by the emission of a pluse from the limited area of a single segment, the emission is to be accomplished substantially more efficiently than a continuous crystal roller. In the continuous roller of the prior art the signal was emitted in all directions as if radiating from the center of the roller thereby causing a large amount of wasted energy from an unclamped ringing of the pulse in the unloaded surface area. By reciprocity a similar loss of efficiency occurs in the receiving mode. Also not readily apparent is the employment of a novel elastic acoustic damping material firmly affixed to the back surface of the stiffener section of each piezoelectric element. This innovative arrangement permits the use of planar segments around the periphery of the roller transducer by providing the small amount of flexibility which is necessary to allow each planar segment to assume a normal position to the test surface at more than one angular position on the wheel transducer. This action is not obtainable with the prior art where the planar piezoelectric segments were placed at the wheel hub of a solid structure and acoustic energy was transmitted to the rim through an arcoid shaped solid structure to proviqe a line and not an area contact with the test article. Such transducers couple a longitudinal wave at only one angular position for each piezoelectric segment located at the hub and, therefore, do not provide complete inspection of the test article as does the area and line coupled wheel of this invention. Other roller transducers of the prior art are limited to frequencies below 500 KHz (because of half-wave piezoelectric thickness requirements) and are inefficient because they are not segmented as described above.

BRIEF DESCRIPTION OF THE DRAWINGS

FIG. 1 is a perspective view of a workpiece upon which is illustrated the probe of this invention in a working mode;

FIG. 2 is a side elevational view of the first embodiment of the probe of this invention employing a plurality of substantially planar segments arranged around the outer periphery of the roller probe;

FIG. 3 is a sectional view of the first embodiment of the invention taken along line 3—3 of FIG. 2;

FIG. 4 is a sectional view taken along lines 4—4 of FIG. 3 illustrating the simultaneous flat contact of two consecutive planar segments with the workpiece thereof;

FIG. 5 is a cross-sectional view similar to FIG. 4 but illustrating an alternative arrangement of the invention;

DETAILED DESCRIPTION OF THE SHOWN EMBODIMENTS

Figure 6:
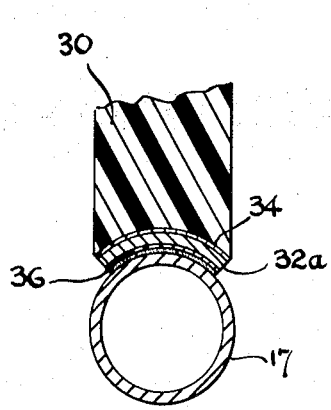
FIG. 6 is a partial sectional view of a probe corresponding to FIG. 3 but with concave surfaced crystal segments useful for curved workpieces such as pipe.

Referring particularly to the drawings and specifically to FIG. 1, the apparatus of this invention comprises a device for nondestructive testing or inspection which may illustratively take the form of a manually operated probe, generally indicated at 10, having a rotatable portion 12 being supported by support rod 14. Probe 10 is shown in operative relationship with a workpiece of a lightweight panel, indicated generally at 15, comprising upper and lower face sheets 16 and 18, respectively, with a core material 20 secured therebetween. Probe 10 is energized by an electrical connection with a suitable source 22 which may take various forms known to the prior art, the details of which are beyond the scope of the invention defined by this application. Illustratively, source 22 may conform with the power circuitries of any commercially available pulse echo or through transmission visually interpreted ultrasonic test equipment. Alarm and recording systems may be added for high speed inspection.

The support rod 14 is rotatively secured centrally within roller core 24 and retained against disassociation therewith by snap ring 26 as seen in FIG. 3. Attached to the outer extremity of support rod 14 is a handle 28 to facilitate manual grasping and movement of the probe 10. Surrounding core 24 in a concentric manner is resilient mateial 30. Attached to the outer periphery of material 30 are a plurality of segments 32. Each of the segments 32 are composed of a ceramic material of the type commonly used in acoustical probes and the like, characterized by a propensity to distort or deform upon application of an electrical signal thereto. This deforming is commonly referred to as the piezoelectric effect. Each of the segments or crystals 32 could be made from such materials as lead titanate or lead zirconate or any other material which is susceptible to the piezoelectric effect. To permit application of electrical signals to the segments 32, each segment 32 is preferably plated with any suitable electrically conductive metal or alloy such as silver as suggested by thin metallic coatings 34 and 36.

To provide for the proper flexible, mechanical support as well as an acoustical damping means for the extremely thin piezoelectric segments 32 (2 to 15 MHz), a triangular backing member 35 is bonded to each individual segment. Each member 35 comprises an epoxy tungsten elongated stiffener having a pinnacle portion 37. The bonding of the triangular backing 35 to a segment 32 comprises a singular unit, indicated generally at 38, mounted within the outer peripheral wall 39 of elastomeric material 30. Said member 35, in addition to providing mechanical support to prevent fracture of the crystals, also provides acoustical damping to the elements and is similar in composition to said solid core 24.

The roller core 24 is formed of a substantially hard material, it having been found that a combination of epoxy and tungsten powder is quite satisfactory in providing an acoustical match and damping of the mechanical stresses of the piezoelectric segments 32. The resilient material 30 surrounds the core 20 and comprises a silicone material filled with powdered metal to provide an adequate impedance match with the segments 32 and with the damping core 24. The desired electrical impedance is selected by the proper combination of metal powder and resin to form material 30. It has been found that desirable resins are available of the type which vulcanize at room temperature. The material 30 includes the physical property of being sufficiently resilient to permit each of the segments 32 to depress slightly within the material 30 as each segment is pressed against the workpiece. To be more specific, each unit 38 is disposed in a juxtaposed relationship to each other with the adjacent pinnacle portions 37 forming an enlarged flexible area 40 therebetween, as clearly shown in FIG. 4. Small air holes or bores 42 are provided within each area 40, and are disposed in such a manner as to traverse the width of said flexible elastomer material 30 and positioned parallel to each adjacent member 35 as illustrated in FIG. 3. Said bores 42 provide the needed room for displacement of said elastomer 30 between units 38 as they are individually displaced when contact is made with the work surface. This is illustrated in FIG. 4 wherein there is shown two adjacent segments contacting surface 16, each being normal to and in flat contact with said surface as the wheel rotates, and at which time holes or bores 42 are deformed as indicated at 42a, b and c, respectively. Therefore, because of the resiliency of material 30, at least two (in number) segments 32 are in constant contact with the workpiece as the wheel is rotated. In some designs three (in number) segments are in contact with the workpiece. Each segment may be used indefinitely for pulse receive or they may be alternated as transmiter and receiver. This flexible relationship has been found to be prerequisite when employing the flat segments and most desirable when alternating the segments 32 from emitter to transmitter. This alternating of the crystal segments 32 will permit the testing of extremely thin workpiece materials without the need of a delay line or similar article to prevent the blocking of the received signal by the final ringing of the initial emitting pulse. In other words, the damping requirements are not as severe. The piezoelectric segments 32, with two (in number) in contact with the workpiece and with one segment as a receiver and the other segment as a transmitter, function similar to completely separate transmitting and receiving units with the difference being that the separate units in the embodiment of FIG. 2 are alternately spaced around the circumference of the roller material 30. It is to be considered within the scope of this invention to form the material 30 of a substantially non-resilient material (similar to the damping material 24) thereby causing only one segment 32 to be in contact with the workpiece at a given time. In such a case each segment 32 would act as both emitter and receiver and would be curved rather than flat. The foregoing considerations also apply to the structure of FIG. 6 wherein the segments 32a are concave to facilitate inspection of pipe 17.

Appropriate means are included within probe 10 for creating an electrical potential between the radially innermost and radically outermost surfaces 34 and 36 of each piezoelectric crystal 32. Any conventional comutation or switching system may be employed. Illustratively one form of such means of providing an electrical potential would be to employ a first resilient leaf spring 44. The first leaf spring 44 is fixedly secured to rod 14 in a non-electrically conducting manner. Second leaf spring 46 is also fixedly seucred to rod 14 and also not capable of transmitting an electrical potential therebetween. Leaf spring 44 is to be in contact with coating 36 and capable of applying electrical energy thereto from source 22 through conductor 47. Leaf spring 46 is to be in electrical contact with coating 34. Electrical energy therefrom is conducted through conductor 48 to an appropriate pulse generator and echo or received signal display device included within source 22. The angular positioning of springs 44 and 46 is to be such as to be contact with the segment or segments which are in contact with the surface of the workpiece. If it is desired to employ the roller probe 10 with a single segment 32 functioning as both emitter and receiver, the leaf spring 38 would be in contact with the coating 36 of a single segment 32 with the leaf spring 46 being in contact with coating 34 of the same segment 32. If it is desired to employ adjacent segments wherein one segment functions as a transmitter and the second segment functions as a receiver, leaf spring 44 will be in contact with coating 36 of the first segment 32 with the leaf spring 40 being in contact with coating 34 of the same segment 32. In a similar manner, additional leave springs will be required to contact the electrical coatings on the adjacent segment in contact with the test article.

It is to be understood that inspection of workpieces, such as shown in FIG. 1, is performed by traversing one surface of the workpiece, such as facesheet 16 with roller 12, by application of force to handle 28 on probe 10. The action thus achieved is far more rapid and effective than the sliding movement of a flat probe such as known in the prior art, particularly when the contacted surface of a given workpiece is rough, uneven, curved or characterized by high friction materials. While not illustrated, it is also understood that this device may be employed as a through transmission system by employing one or more roller devices on the top surface and one or more roller devices on the lower surface of the test configuration.

It will be further understood that acoustical or vibrational transmission between crystal 32 and the workpiece mass may be significantly enhanced by the use of one or more couplants, many of which are known and widely used in industry. However, it is a separate very significant feature of the inventive concept in this application that no liquid, past or gel-like materials are used as couplants in connection with operation of probe 10. Instead, it has been found that all the problems associated with the use of such wet couplants, known to the prior art, may be avoided by the use of a dry or substantially dry couplant material such as discussed below. Thus, the coupling media between crystal 32 and the workpiece surface 16 preferably comprises an adhesive coating 50 applied over silver plating 34 of each of the segments about the roller 12. The adhesive layer 50 may consist of the relatively tenacious but non-permanent adhesives used on familiar types of masking tape or scotch tape and requiring no moistening to produce their adhesive qualities. Preferably, the adhesives contemplated for use in dry couplant systems disclosed herein are pressure sensitive and viscous in nature, referring to the property of deforming elastically under pressure somewhat in a gel-like manner. Illustratively, most satisfactory are the low viscosity adhesives resulting from a mixture of silicone, resins and gums in aromatic solvents, preferably without a peroxide catalyst, and which are inherently tacky at room temperature. It will be understood that dry adhesives of the foregoing type, in the absence of preventing measures, tend to lose their effectiveness due to their propensity for picking up dust, lint, foreign materials and the like from test surfaces. Accordingly, use of such adhesives to provide a mechanical bond between crystal 32 and a test surface, would require clean room conditions and dust free surfaces. In addition to the mentioned adhesives, other commercially available adhesives may be suitable for the mentioned purpose, the most acceptable among such being those which form a strong but temporary bond between crystal 32 and the workpiece surface. Moreover, the selection of any particular adhesive should include due consideration of the workpiece materials to insure that no tearing or adverse chemical affects result between the adhesives and workpiece. Where otherwise convenient, the coating of adhesive, instead of being applied to crystal 32, may be applied over the workpiece surface, such as in an intermediate stage of workpiece fabrication, and a probe 10 shown in FIG. 1 could then be used without the adhesive coating 50.

Further, it has been found that the use of adhesives in forming a substantially dry couplant between the crystal 32 and the workpiece surface is considerably facilitated in efficiency by coating the adhesive surface with a layer of granules or powdered particulates of hard materials such as glass, ceramic, or the like. Referring particularly to FIG. 3 of the drawing, a coating of glass beads 51 from 5 to 25 microns in diameter has been applied to the exterior surface of adhesive coating 50. Such layer of glass beads 51 has been found to provide very satisfactory results especially with the glass beads in the lower size range between 5 and 10 microns. Although not essential, the mentioned glass beads 51 may have a coating of silver such as used on the surfaces of weather balloons, motion picture screens, and the like. Such a relatively thin layer of glass beads 51 within the mentiond size range, when used in the dry couplant system disclosed herein, provides thousands of point contacts with the test article and exhibit certain properties such as the ability to form a flexible layer with the adhesive base which deforms easily as required to conform closely with the contacting surface, especially one having uneven contour or otherwise not perfectly flat. Moreover, the propensity of the adhesive coating 50 to pick up dust or other particles is avoided by coating the adhesive layer with glass beads 51.

It will be further understood that a layer of solventless silicone elastomers may also be employed with or without bead or particle surface to provide an efficient dry acoustical coupling media and form a good mechanical bond to rough surfaces and weldments.

It is to be understood that in employing the probe as shown in FIGS. 1 to 4, wherein the segments 32 of the probe are substantially planar and material 30 being substantially resilient in effect, an area contact is established with the equivalent of at least two segments 32 in contact at all times with the workpiece surface 16. This area contact may be substantially smaller than the disc type of probe which has been commonly used in the prior art. Although it is known that an area type of probe is able to discern localized defects with the workpiece, the use of adjacent segments, one as the emitter and one as the receiver, makes possible the inspection of extremely thin materials, much thinner than are possible with conventional area type probes known to the prior art. Therefore, although a certain amount of resolution is lost through area type contact of flat segmented crystals with the workpiece, the degree of resolution thus achieved is still very acceptable with many types of workpieces and is superior to that achieved in flat disc type probes known to the prior art. Further, as noted above, probe 10 is capable of inspecting extremely thin materials which heretofore was not possible with disc-type probes.

When a fan-shaped beam is an advantage or when inspecting at frequencies where the wave length in the material may be relatively long, or where multiple scans are to be obviated, it is of particular advantage to employ a line contact between crystal 32 and the workpiece instead of an area contact of the embodiment of FIG. 1. Such line contact results in a substantial increase in plan-position resolving power from the small area of the line contact between the crystal 32 and the testing surface 16. Thus, a small defect in an extremely localized portion between facesheets 16 and 18 could not be readily located by a conventional disc probe whereas such defect could easily be located by a line contact probe.

To establish such a line contact between the workpiece surface and the crystal, the embodiment of FIG. 5 would be employed. Bascially the probe 52 of the second embodiment of FIG. 4 is constructed similar to the embodiment of FIG. 1 having a roller core 53 which serves as an acoustical damping device and is rotatably mounted upon a support rod and handle assembly not shown. If desired for manufacturing convenience, a cylindrical mass 54 may surround core 53 as seen from FIG. 4, although it is quite acceptable for core 53 to be a single unitary mass extending out to where crystal segments 56 join the same. If core 53 is rigid plastic, mass 54 could be resilient material such as the mentioned silicone elastomer. If mass 54 is omitted, core 53 should consist entirely of a known resilient damping material.

Each of the segments 56 is formed in a shape of an arc thereby permitting the desired line contact with the surface 58. Each of the segments 56 is coated with a silver metallic coating on each side thereof, coating 60 being on the exterior surface of the segments with coating 62 being on the interior surface of the segment 56. In a manner similar to that of the embodiment of FIG. 1 a layer of adhesive or solventless elastomer resin 64 is secured to the exterior silver coating 60 of each of the segments mounted upon the probe 52, with a layer of glass beads 66 being secured to exterior surface of the adhesive layer 64. Also, in a manner similar to that of the embodiment of FIG. 1, appropriate means are to be included to provide for the transmission of electrical potential to a particular segment and also the receiving therefrom of the reflected energy and transmission to an appropriate displaying apparatus. Such emitting and receiving means can take the form of a leaf spring arrangement similar to the embodiment of FIG. 2 with also a similar source arrangement. However, any particular type of such structure could be employed which accomplishes the intended purpose. It is to be noted that within the embodiment of FIG. 5, a single segment serves as both emitter and receiver as only one such segment is in contact with the workpiece surface 58 at a given time.

Figure 9:
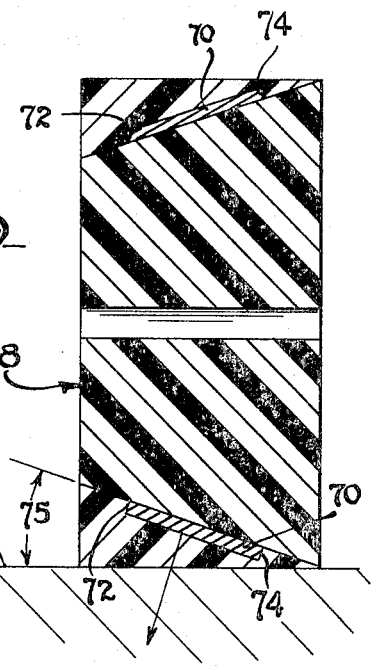
FIG. 9 is a sectional view of one of the probes as shown in FIG. 8.

The segmented type probe of this invention of either the first embodiment of FIG. 1 or the second embodiment of FIG. 5 could be readily employed in various modifications. Referring particularly to FIG. 9 of the drawings, the segments 32 or 56 could be mounted instead of in the shape of a cylindrical probe, in the shape of truncated cone shaped probe, indicated generally at 68, said segments being so formed that when the segments 70 are mounted in the shape of the probe 68, the first ends 72 of the combined segments 70 are at a lesser diameter than the combined second ends 74. The cone shaped probe 68 is to be passed over the inspected surface so that the axis of the cone remains substantially parallel to the inspected surface. The incident angle that the segments 70 make with the inspecting surface can be readily varied by designing the probe so that the refracted angle in the part would be 30°, 45°, 60° or any other reasonable angle. As the electrical pulse generated within the piezoelectric segments 70 is emitted substantially perpendicular thereto, the generated pulse is thereupon transmitted within the inspected surface at the particular defraction angle established by acoustical wedge angle 75 which would be 10°, 14° or 17° or other reasonable angle.

The use of such a cone-shaped probe in conjunction with a normal incidence probe has been found to be of particular advantage when desired to effect the inspection at various distances within the inspected material. In a Delta arrangement, two (in number) probes could be employed. One normal to the surface (receiver) and one preset at a specific difraction angle (transmitter). In this manner, with one probe functioning as the transmitter and the other functioning as the receiver, the combined Delta probe arrangement could readily determine defects within the uppermost layer of the inspected material, the bottommost layer of the inspected material or any particular level in between. Using this principle and employing the Delta arrangement of probes, by longitudinally spacing apart the probes, specific areas within the inspected material can be readily inspected.

Figure 8:
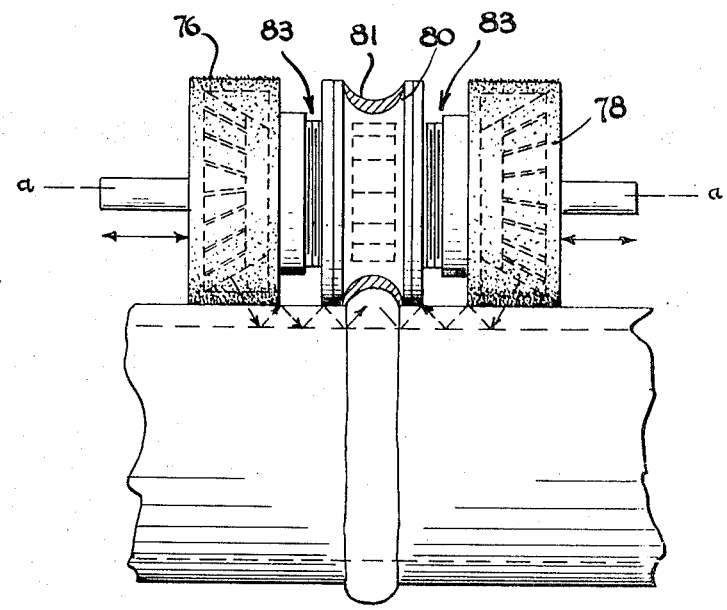
FIG. 8 is a modification of the invention wherein the curved or planar segments of the first and second embodiments could be mounted in the form of a truncated cone to form a rotating Delta tool for orbital inspection of brazed, welded, or rectilinear joints.

The truncated cone-shaped probes 68 can be readily employed in numerous specific inspection apparatuses. Referring particularly to FIG. 8 of the drawings, first and second cone shaped probes 76 and 78, respectively, are mounted with a basically conventional cylindrical type probe 80 located intermediate the first and second probes 76 and 78. The exterior surface 81 of the cylindrical probe 80 can be flexible and will readily conform to a particular inspection area such as a raised welded portion forming a joint between metallic tubular members. The spacing between the first probe 76, the cylindrical probe 80, and the second probe 78 is readily adjustable by an adjusting means generally indicated at 83. Each element is adjusted along the longitudinal axis a—a as illustrated in FIG. 8. The cylindrical probe 80 is to function as a piezoelectric receiving element with the first probe 76 and second probe 78 functioning as piezoelectric transmitters. The first probe 76 may be spaced very near the cylindrical probe 80 so that inspection of the upper surface of the welded joint or very near thereto is effected with the second probe 78 being spaced a greater distance from cylindrical probe 80 so that inspection of the far side surface of the welded joint is effected or some layer intermediate thereof of the joint.

Figure 10:
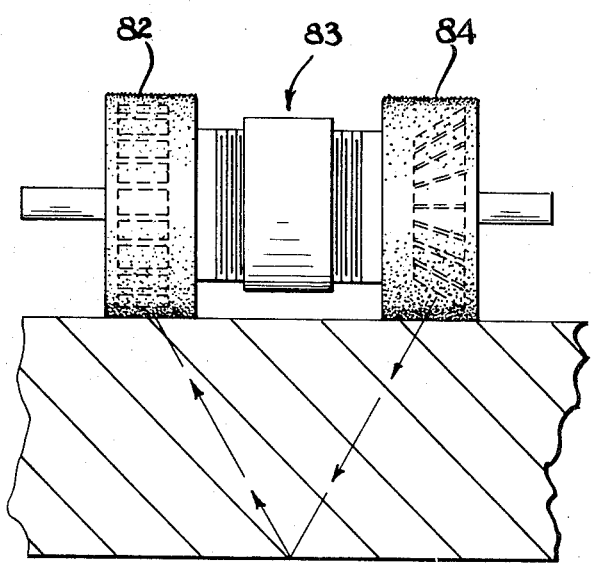
FIG. 10 is a plan view of another modification of the first and second embodiments of the invention wherein the rollers are adjustable relative to each other and form an angular beam transducer.

In referring to the rotating Delta test tool illustrated in FIG. 10 of the drawing, cylindrical probe 82 is mounted in an adjustable spacing manner by means 83 with a cone-shaped probe 84. Such a tool has been found to be of particular advantage to effect inspection of the lower layer or layers of the inspection material such as lower surface corrosion. The line probe of FIG. 10 is basically similar to that shown in FIG. 8 except not being adapted to conform to any particular type of inspecting surface such as a welded joint.

Figure 7:
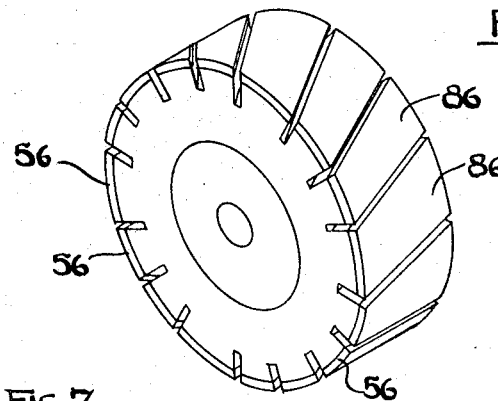
FIG. 7 is a perspective view of a roller probe having an alternative configuration of the crystal segments.

In referring particularly to embodiment of FIG. 7 drawings, it may in some instances be desirable to have more than one segment 56 be in contact with the inspecting surface at any given instance. It has been found that this may be accomplished by the forming of each of the segments 56 with a substantially parallelogram shaped upper surface 86. The contact of the upper surface of the segments 56 with the workpiece surface to be inspected is in a line direction parallel to the axis of the probe. Therefore, according to the angle of the parallelogram shape of the upper surface 86, two adjacent segments 56 could be functioning at the same time. By employing such a parallelogram arrangement of the segments 56, no gaps or misses in transmission result which could occur in the embodiment of FIG. 5. This parallelogram configuration is illustrated in FIG. 7. Such gaps, although small, could readily not detect a small defect or disbond located within the inspecting material. The devices described above may be hand held for field inspection or machine driven for rapid inspection of large areas.

I claim:

1. An ultrasonic probe for use upon a surface of a workpiece for non-destructive testing to identify defects in the workpiece, said probe including:

a rotatable flexible portion adapted for rolling along a surface of said workpiece;

a purality of discrete and slightly spaced-apart segmented units movably attached substantially continuously around the periphery of said rotatable flexible portion and wherein said flexible portion is sufficiently resilient to permit each segmented unit supported therein to make progressive individual surface contact thereby allowing at least two adjacent units to simultaneously contact said workpiece surface during rolling of said rotatable portion therealong, said segmented units being piezoelectrically responsive and mounted to said flexible portion to provide an acoustical couple that is normal to the workpiece surface at all times, said units alternating as a receiver and transmitter as said probe is rolled along the workpiece surface, said segmented units comprise a first single segment reacting piezoelectrically as an emitter of an ultrasonic pulse, said pulse being transmittable within said workpiece; and said units further comprising a second single segment reacting piezoelectrically as a receiver of an ultrasonic pulse, said pulse being transmitted from said workpiece;

both said first and second segments being adapted to contact and lie flat on said workpiece surface simultaneously as said rotatable flexible portion is flexibly deformed when rolled along said workpiece, and couplant means located between each of said units and said workpiece surface to provide efficient transmission of ultrasonic sound waves.

2. An apparatus as defined in claim 1 wherein:

each of said segments responds piezoelectrically as both an emitter and a receiver of said ultrasonic waves.

3. An apparatus as defined in claim 1 wherein:

each of said segments comprises a substantially planar surface adapted to contact said workpiece surface.

4. An apparatus as defined in claim 1 wherein:

each of said segments comprises a concave surface adapted to contact said workpiece surface.

5. An apparatus as defined in claim 3 wherein:

said rotatable flexible portion includes a segmented unit supporting material, said segmented unit supporting material being resilient to permit slight depressing of each said segmented unit upon application of slight force against said unit toward said material, whereby upon rolling movement of said rotatable flexible portion upon said workpiece at least two of said segments of said segmented units will simultaneously contact and lie flat upon said workpiece.

6. An apapratus as defined in claim 5 wherein:

said couplant means includes a layer of solventless elastomer resin.

7. An apparatus as defined in claim 6 wherein each of said segmented units further include:

a backing member bonded to each segment thereof and movably supported within said flexible portion of said probe.

8. An apparatus as defined in claim 7 wherein said backing member comprises:

an epoxy tungsten elongated stiffener to provide mechanical support to said individual segments and acoustical damping thereof.

9. An apparatus as defined in claim 7 wherein said flexible portion includes:

a plurality of bores disposed between said backing members and parallel thereto, to provide for displacement within said flexible portion.

10. An apparatus as defined in claim 7 wherein:

said rotatable portion includes substantially non-resilient segment supporting material adapted for acoustically damping stresses developed by said piezoelectric segments.

11. An apparatus as defined in claim 10 wherein:

said couplant means includes a layer of adhesive upon which is applied a layer of particulate of a hard material.

12. An apparatus as defined in claim 10 wherein:

said couplant means comprises a layer of solventless elastomer.

13. An apparatus as set forth in claim 12 wherein:

each of said segments is substantially arcuate in configuration.

14. An apparatus as set forth in claim 12 wherein each of said segments comprises:

an exterior surface having substantially the configuration of a parallelogram.

15. An ultrasonic probe apparatus for use upon a workpiece surface for non-destructively detecting internal defects including disbonds in laminated structures, said probe comprising:

a substantially cylindrical rotatable portion, said rotatable portion including a resilient segment supporting material;

support means for supporting said rotatable portion rotationally relative to said workpiece surface;

a plurality of discrete and slightly spaced-apart segments secured to the periphery of said segment supporting material, each of said segments being piezoelectrically responsive and providing an acoustical couple that is normal to the workpiece surface at all times as said probe is rolled along the workpiece surface, each of said segments having a coating of electrically conducting material upon the interior and exterior surfaces thereof;

electric signal supply means for supplying signals to each of said segments through said conducting material;

a layer of adhesive attached to said exterior electrically conducting material of said segments; and a plurality of glass beads from 5 to 25 microns in diameter attached to said adhesive and adapted to make direct contact with said workpiece.

16. An ultrasonic probe apparatus as recited in claim 15 wherein said probe includes:

an acoustical damping means secured to each segment thereof and mechanically supporting said segment in a movable relationship within said resilient supporting material.

17. An ultrasonic probe apparatus as recited in claim 16 wherein said acoustical damping means comprises:

a triangular backing member bonded to each segment thereof providing means for said each segment to be movably supported within said cylindrical rotatable portion of the probe.

18. An ultrasonic probe apparatus as recited in claim 17 wherein said resilient supporting material includes:

a plurality of spaced apart bores positioned between each of said backing member, whereby said resilient material can be displaced as said segments contact the workpiece surface in a relatively flat manner.

19. An ultrasonic probe apparatus for use upon a workpiece surface having a weld point thereon for non-destructively detecting internal defects, said probe comprising:

a first substantially cylindrical rotatable probe portion operably disposed about a concentric axis and position on one side of said weld joint;

a second substantially cylindrical rotatable probe portion oppositely disposed along the same concentric axis with respect to the weld joint positioned therebetween;

means for rotatably supporting said first and second probe portions providing said concentric axis therefor;

adjusting means operably connected to said first and second probe portions whereby said probe portions can be adjusted relative to each other along said concentric axis for a specific workpiece configuration;

said first and second probe portions have a plurality of discrete and slightly spaced-apart segments secured to said probes, each of said segments being piezoelectrically responsive; and said probe portions is provided with a plurality of planar-segments, and wherein at least one of said oppositely disposed probe portions is provided with a plurality of segments angularly positioned with respect to said workpiece surface forming a truncated cone-shaped configuration about said axis of said probe.

20. An ultrasonic probe apparatus as recited in claim 19 wherein each of said probe portions is provided with a plurality of piezoelectrically responsive segments disposed thereon at an angular relationship with respect to said workpiece surface forming a truncated cone shaped configuration, about said axis of said probe, said probe apparatus including a third probe portion disposed intermediate said first and second probe portions.

* * * * *